United States Patent [19]

Witriol et al.

[11] 4,027,143
[45] May 31, 1977

[54] ENCODING ALTIMETER

[76] Inventors: Norman M. Witriol, 2501 Lancelot Drive SE., Huntsville, Ala. 35803; Carlton L. Frederick, 518 Dryden Road, Ithaca, N.Y. 14850

[22] Filed: Mar. 8, 1976

[21] Appl. No.: 664,591

Related U.S. Application Data

[62] Division of Ser. No. 533,576, Dec. 17, 1974, Pat. No. 3,961,272.

[52] U.S. Cl. .............................. 235/92 PE; 73/384; 235/92 DN; 235/92 MT; 235/92 R
[51] Int. Cl.² ................... G06M 3/02; H03K 21/36
[58] Field of Search ...... 235/92 PE, 92 EA, 92 TC, 235/92 MT, 92 DN, 92 CA, 92 T, 92 FQ, 92 V; 340/384 E, 27 AT, 75; 73/384

[56] References Cited
UNITED STATES PATENTS

| | | |
|---|---|---|
| 3,659,081 | 4/1972 | Piccione ........................ 235/92 PE |
| 3,789,194 | 1/1974 | Kirby ............................... 235/92 V |
| 3,789,195 | 1/1974 | Meier et al. .................... 235/92 PE |
| 3,878,370 | 4/1975 | Santomango et al. ........ 235/92 CA |
| 3,917,928 | 11/1975 | Wesner .......................... 235/92 CA |
| 3,920,961 | 11/1975 | Berg ............................... 235/92 T |

*Primary Examiner*—Joseph M. Thesz
*Attorney, Agent, or Firm*—Nathan Edelberg; Robert P. Gibson; Robert C. Sims

[57] ABSTRACT

The pressure of the atmosphere is sensed by a pressure transducer which causes a resistance to vary. The variance of this resistor is converted to a variable frequency. The number of cycles of this frequency in a set amount of time is counted by a counter and displayed by a digital display. An up/down counter is loaded with the count of the last digital readout in the previous cycle and counts down the number of cycles in the frequency of the next reading and displays the difference on a digital display or activates a sonic output if the countdown is greater than the stored previous count.

3 Claims, 3 Drawing Figures

ENCODING ALTIMETER

This is a division of applicaton Ser. No. 533,576, filed Dec. 17, 1974. The application is now U.S. Pat. No. 3,961,272, issued May 1, 1976.

BACKGROUND OF THE INVENTION

The field of the invention is related to altimeters and vertical velocity altimeters. Current altimeters use an aneroid barometer which mechanically moves three hands around a circular dial to display altitude. Current encoding altimeters use this type display together with various expensive means of converting this information to the code necessary for input to the aircraft transponder for transmission to a ground facility. Current ordinary vertical velocity indicators use an aneroid barometer with a pinhole in the static system to provide information on the rate of altitude change. This information is displayed to the pilot by a mechanically moving hand rotating around a circular dial. Current instantaneous vertical velocity indicators function in a similar manner except that they have a mechanical system which compensates for the delay time in the ordinary vertical velocity indicator. The ordinary vertical velocity indicator's cost is comparable with that of an altimeter, and the instantaneous vertical velocity indicator is roughly three times the cost of the ordinary variety. The current encoding altimeter cost is about 10 times the cost of an altimeter. General devices to warm pilots of an approaching preset altitude are nonexistent due to the fact that they would have to be self-contained and thus be very expensive. Specific devices to warm of minimum altitudes do exist and are exceedingly expensive.

It is noted that many instruments in the panel of the prior art are of the dial variety and due to the large number of these dials situated around the cockpit, assimilation and interpretation of information by the pilot is difficult and time consuming.

SUMMARY OF THE INVENTION

A pressure transducer made up of a barometer with a movable plate controls the amount of light falling on a photocell by a light emitting diode. The resistance of this photocell is measured and converted into a variable frequency in accordance with the amount of resistance. A clock activates a flip flop which in turn activates an AND gate to which the variable frequency is also connected. The output of the AND gate is fed to a counter. After a predetermined time the flip flop and the AND gates are turned off, and the count on the counter is displayed by a digital display to indicate the altitude. This count is also sent to and stored in an up/down counter. The clock will once again reset the flip flop, which in turn resets the AND gate, and the counter will once again start to count the number of cycles in the variable frequency over the counting period of time. The output of the AND gate is also connected to an up/down counter which will count down the amount stored therein during the next period of time. The value of the up/down counter is fed to a digitl display. If the value of the up/down counter goes to zero, the circuitry will cause the up/down counter to count up and inactivate a minus sign display. A predetermined altitude value may be fed into another up/down counter by a digital switch. If the countdown does not go below zero the up/down counter will activate a son-alert.

DESCRIPTION OF THE PREFERRED EMBODIMENT

Altimeter devices may be used such as a barometer which directly connects to vary a potentiometer to change its resistance. Another technique would be to connect the aneroid barometer to a capacitor plate. The varying altitude would cause a varying capacitance and then in FIG. 1 instead of using a resistance to frequency chip 16, one would use a capacitance to frequency circuit. An additional similar technique would be to connect the aneroid barometer to an inductance slug. The varying altitude would cause a varying inductance and then in FIG. 2 instead of a resistance to frequency chip 16, one would use an inductance to frequency circuit. As is well known, the height of an airship is inversely proportional to atmosphere pressure.

Figure 2:
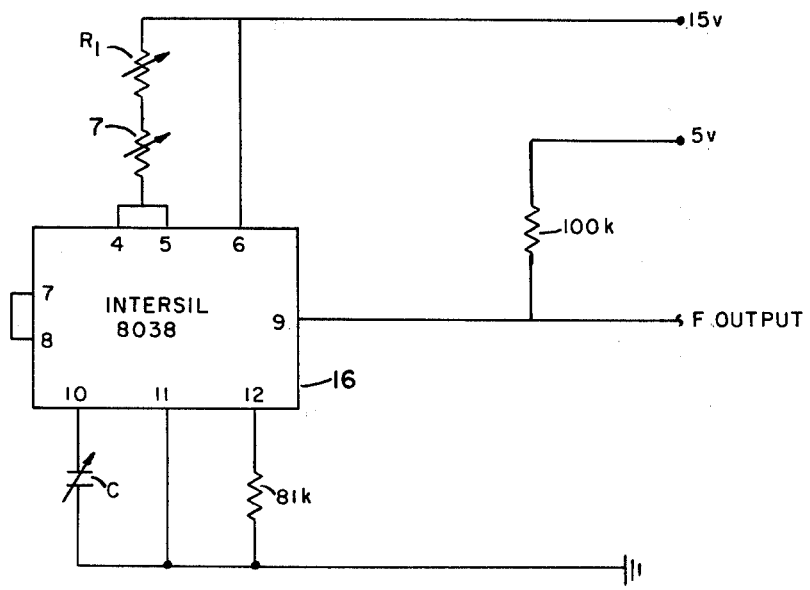
FIG. 2 is a schematic showing of a voltage control oscillator.

FIG. 2 shows that the resistance of the photocell 7 is connected in a circuit to a "resistance to frequency chip" 16. This block 16 may be any of the well known voltage control oscillators such as the Interil 8038 chip. A 15 volt dc supply is connected through variable resistor R1 and 7 to the input of the voltage control oscillator 16 so as to control its output frequency in accordance with the value of the resistors R1 and 7. Resistor R1 is a barometer trim resistor used to calibrate the barometer with respect to atmospheric conditions. Capacitor C is an instrument scale adjustor.

Figure 1:
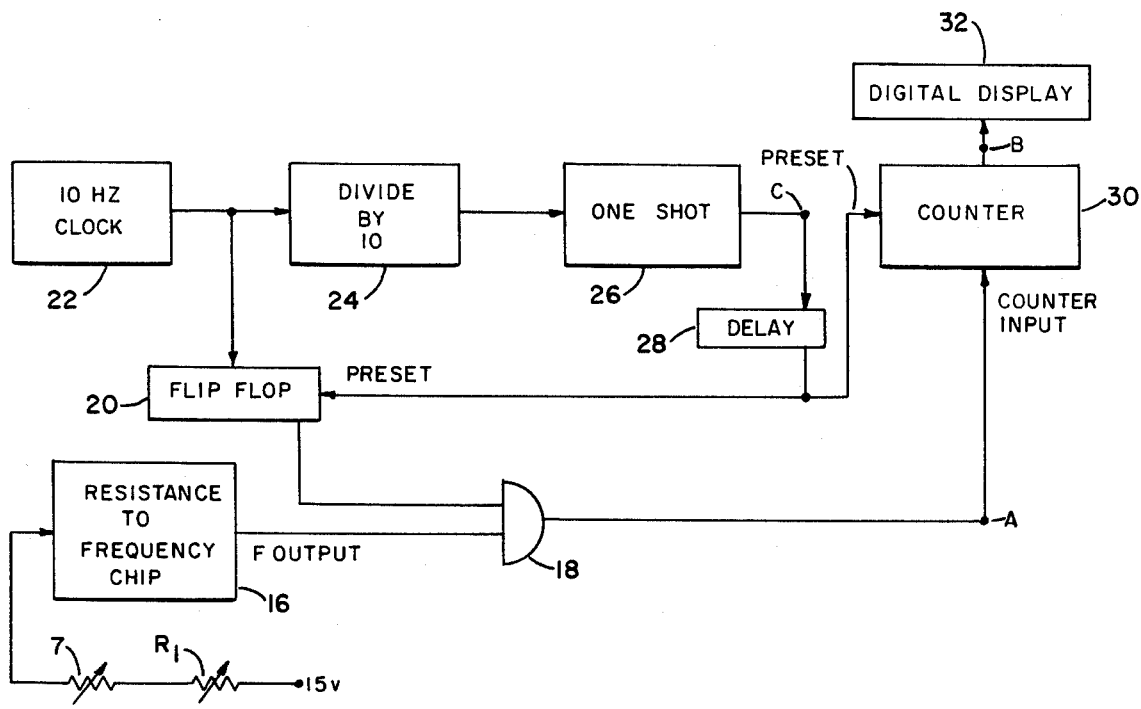
FIG. 1 is a block diagram illustrating a portion of a digital altimeter.

In FIG. 1 it can be seen that the output of the resistance to frequency chip 16 is fed to one input of an AND gate 18. The other input of the AND gate 18 is connected to an output of a flip flop 20. The set input of flip flop 20 is connected to an output of a 10 Hz clock 22. When the flip flop is in a preset condition, the output of the flip flop is positive, therefore, enabling AND gate 18. A divide by ten circuit 24, a one shot multivibrator 26 and a delay device 28 are connected in series between the output of the clock and the preset of flip flop 20. Any of the well known divide by ten circuits, one shot circuits and delay devices may be used. The one shot 26 is also connected through a delay 28 to a reset input of a three decade counter 30. The counter is progammed to reset to a minus altitude in order to provide an altitude offset capability through resistor R. In the present case, we programmed it to reset to 900 (which is equivalent to −100) instead of to 000. Any of the well known counters and digital displays 32 may be used.

In the operation of FIG. 1 the analog input, which is the amount of resistance of the altimeter, causes a frequency to be generated by chip 16 which is proportional to the resistance. The frequency is counted for one clock cycle of clock 22 by counter 30 (minus the small delay caused by delay device 28). If the vertical velocity indicator function is not to be used, then delay device 28 could be eliminated.

The frequency output of voltage control oscillator 16 causes the AND gate 18 to go on and off in accordance to the value of the frequency. This will in effect produce pulses to the input of a three decade counter 30. These pulses are counted until clock 22 causes flip flop 20 to go into its set condition. The output of flip flop 20 then goes to 0 (or minus) and disenables AND gate 18. This stops the count of counter 30. The count is displayed digitally by a digital display 32 which in effect is a display of the frequency of block 16. Digital display 32 displaces the count for nine cycles of clock 22 plus the time of delay 28, after which time the one shot 22 resets counter 30, presets a flip flop 20, and the process cycles over again.

The amount of time delay caused by delay 28 is small when compared to one clock cycle. It is less than one hundredth of a clock cycle. Delay 28 prevents the resetting of counter 30 until its count is fed into point B. The Hz output of chip 16 can be calibrated so that the number read on digital display 32 is equal to the airship's height in feet (or in meters, inches, etc.).

Figure 3:
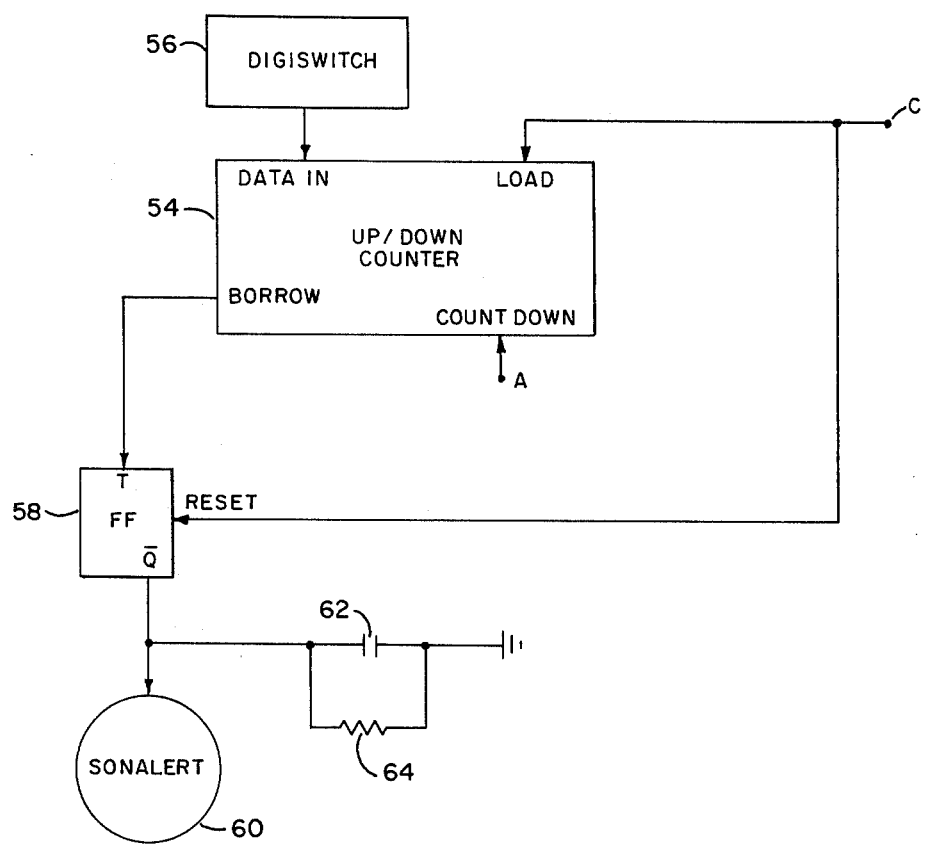
FIG. 3 is a block diagram of a minimal altitude warning unit.

FIG. 3 shows a minimum altitude warning circuit. A further up/down counter 54 is connected to points A and C of FIG. 1 as indicated. Instead of feeding the previous altitude from point B of FIG. 1 to counter 54, the altitude to be counted down is fed in by a digiswitch 56. A numerical value is set on digit switch 56 by the pilot or a computer. The actual numbers on the third digit of the digiswitch are displaced by one from the BCD to take into account counter 30 resetting to 900 (i.e. label 9 = BCD 0, label 0 = BCD 1, etc.). This value is fed into counter 54 when the counter is ordered to load by a signal which is connected to the load input of counter 54 at point C. The load signal also resets flip flop 58 producing a voltage output which is connected to a son-alert 60.

A capacitor 62 is connected in parallel with the son-alert and will prevent the son-alert from activating until the capacitor is charged to a predetermined voltage. Charge time of the capacitor is selected such that it is equal to one clock cycle. If the count fed into counter 54 from point A of FIG. 1 has not caused the count to reach zero before one clock cycle, then capacitor 62 will charge up to the predetermined value and son-alert 60 will be activated producing an audible alarm. This alarm will indicate that the airship has dropped below the altitude indicated on digital switch 56. If however the counts from point A count down the value in counter 54 to zero before one clock cycle then the counter will produce an output at its borrow. This output is connected to the trigger of flip flop 58 and will cause flip flop 58 to go into its triggered condition. The output of Q is 0 when flip flop 58 is in its triggered condition.

A resistor 64 is connected across capacitor 62 in order to allow the capacitor to discharge. Capacitor 62 and resistor 64 may be omitted. If they are omitted then the son-alert will produce a blip every time the up/down counter 40 is commanded to load and flip flop 58 is reset. The blip will be of a duration of less than 1/10 of a second as long As the aircraft is above the altitude set on digiswitch 56. This blip will indicate to the pilot that the system is on, and he is above the preset altitude. When the aircraft drops below the altitude set on digital switch 56, the sonalert 60 will produce a continuous tone to indicate the under altitude condition.

We claim:

1. A system comprising a counter having a count down input, a data in input, and a borrow output; first information means connected to the data in input so as to store a first count in the counter; a second information means producing a second count in the form of pulses which said counter can count; said second information means being connected to the count down input so as to cause the counter to count down; said counter producing an output at the borrow output when it is counted down to zero; control circuit connected to the output of said borrow output so as to enable an indicator means when means to obtain a new counter counts down to zero; said second count on said second information means changes periodically; said counter having a load input; and reset signal means connected to the load input so as to cause said counter to reset the first count into the counter whenever a new second count is obtained.

2. A system as set forth in claim 1 wherein said control circuit comprises a flip flop having a trigger input, a reset input, and an output; said trigger input being connected to the borrow output; said reset signal means being connected to the reset input; said indicating means being a sound producing device; and the output of said flip flop being connected to said sound producing device.

3. A system as set forth in claim 2 further comprising a filter circuit connected across said sound producing device so as to prevent said device from producing a sound until said second information means has finished feeding its count into the counter.

* * * * *